United States Patent [19]
Schooler

[11] Patent Number: 6,038,398
[45] Date of Patent: Mar. 14, 2000

[54] METHOD AND APPARATUS FOR IMPROVING PERFORMANCE OF A PROGRAM USING A LOOP INTERCHANGE, LOOP DISTRIBUTION, LOOP INTERCHANGE SEQUENCE

[75] Inventor: Richard Schooler, Cambridge, Mass.

[73] Assignee: Hewlett-Packard Co., Palo Alto, Calif.

[21] Appl. No.: 08/972,623

[22] Filed: Nov. 18, 1997

Related U.S. Application Data

[60] Provisional application No. 60/047,868, May 29, 1997.

[51] Int. Cl.[7] ....................................................... G06F 9/45
[52] U.S. Cl. ............................................ 395/709; 395/705
[58] Field of Search .................................... 395/709, 705, 395/708

[56] References Cited

U.S. PATENT DOCUMENTS

| | | | |
|---|---|---|---|
| 4,833,606 | 5/1989 | Iwasawa et al. | 395/709 |
| 5,151,991 | 9/1992 | Iwasawa et al. | 395/706 |
| 5,230,053 | 7/1993 | Zaiki | 395/706 |
| 5,303,377 | 4/1994 | Gupta et al. | 395/709 |
| 5,457,799 | 10/1995 | Srivstava | 395/709 |
| 5,802,375 | 9/1998 | Ngo et al. | 395/709 |
| 5,805,863 | 9/1998 | Chang et al. | 395/500 |

OTHER PUBLICATIONS

ACM Transactions on Programming Languages and Systems, vol. 18, No. 4, Jul. 1996, pp. 424–453, K. S. McKinley et al., "Improving Data Locality with Loop Transformations".

Bacon, D.; Graham, S.; Sharp, O.; "Compiler Transformations for High Performance Computing"; ACM Computing Surveys; vol. 26, No. 4, pp. 345–420 Dec. 1994.

Pyo, C.; Lee, K.; Han, H.; Lee, G.; "Reference Distance as a Metric for Data Locality"; High Performance Computing on the Information Superhighway, 1997; pp. 151–156 May 1997.

Wolf, M.; Maydan, D.; Chen, D.; "Combining Loop Transformations Considering Caches and Scheduling"; Proceedings of the 29th Annual IEEE/ACM International Symposium on Microarchitecture; pp. 274–286 Dec. 1996.

Kelly, W.; Pugh, W.; "A Unifying Framework for Iteration Reordering Transformations"; IEEE First International Conference on Algorithms and Architectures for Parallel Processing; vol. 1, pp. 153–162 Apr. 1995.

Sass, R.; Mutka, M.; "Enabling Unimodular Transformations"; Proceedings of the Conference on Supercomputing '94; pp. 753–762 Nov. 1994.

Hsieh, B.; "Loop Distribution with Mulitple Exits"; Proceedings of the 1992 Conference on Supercomputing; pp. 204–213, 1992.

Sarkar, V.; Gao, G.; "Optimization of Array by Collective Loop Transformations"; Proceedings of the 1991 International Conference on Supercomputing; pp. 194–205, 1991.

*Primary Examiner*—Tariq R. Hafiz
*Assistant Examiner*—Brian Sattizahn

[57] ABSTRACT

A compiler optimizing procedure improves a sequence of memory addressing actions of a program, wherein the program includes a plurality of do loops. The procedure includes the steps of: performing an interchange of do loops, within a set of nested loops, to move at least one loop of the set to a position of an outer loop, wherein the one loop manifests a condition which prevents application of a distribution action thereto; attempting a distribution of next outermost loops so as to isolate a code segment in the program from remaining interior loops in the set of nested loops; and if the distribution is performed, determining for each remaining interior loop if an interchange with another interior loop will improve an efficiency of execution of the program and if yes, performing the loop interchange.

8 Claims, 2 Drawing Sheets

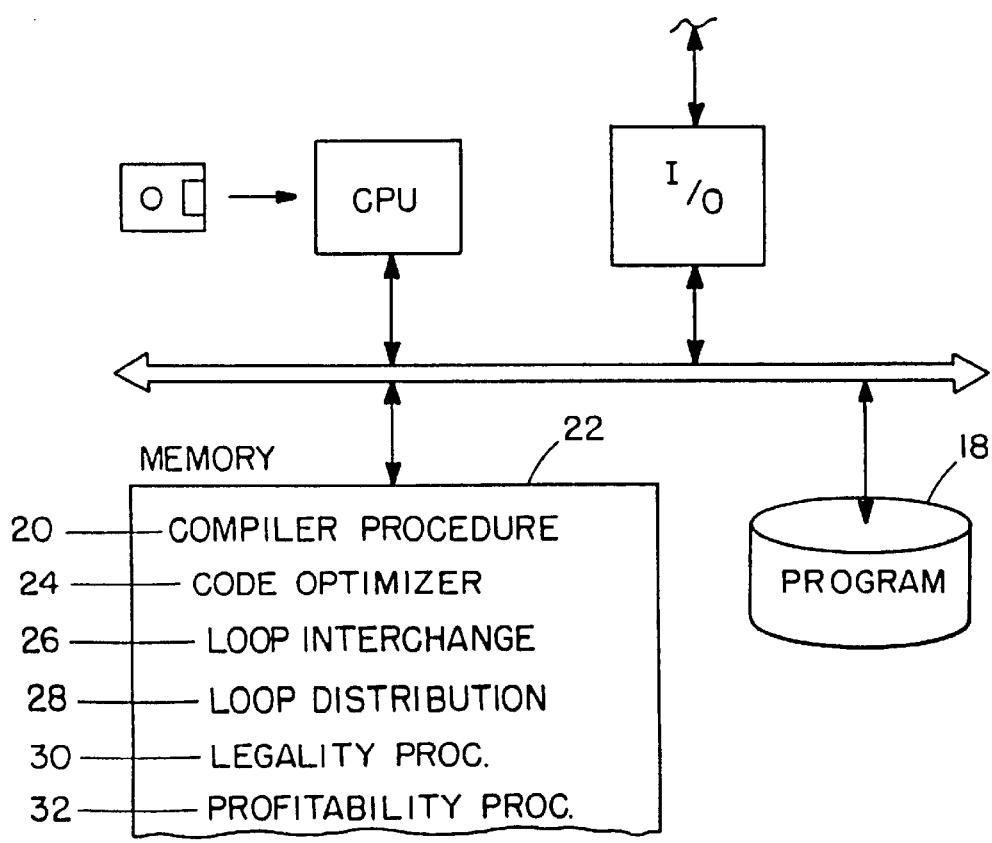

METHOD AND APPARATUS FOR IMPROVING PERFORMANCE OF A PROGRAM USING A LOOP INTERCHANGE, LOOP DISTRIBUTION, LOOP INTERCHANGE SEQUENCE

This patent application claims priority from Provisional Patent Application Serial No. 60/047,868, filed May 29, 1997.

FIELD OF THE INVENTION

This invention relates to compiler programs and, more particularly, to a compiler program which includes an optimizing procedure which, through use of loop interchanges and loop distributions, improves a sequence of memory addressing actions of an application program being compiled.

BACKGROUND OF THE INVENTION

Loop interchange is a program transformation that re-orders loop inclusions or "nests". A loop interchange is illustrated by the following example:

|    | Before      |    | After       |
|----|-------------|----|-------------|
| a) | DO I = 0,9  |    | DO J = 0,9  |
| b) | DO J = 0,9  | => | DO I = 0,9  |
| c) | A(I,J) = 0  |    | A(I,J) = 0  |

Example 1

To paraphrase the above steps in the "before" code: step a) indicates that the value of I should be calculated for each of the values stored in an I×J memory matrix at I positions 0–9; step b) indicates that the value of J should be calculated, for every value of I, for each of the values stored in the I×J memory matrix at J positions 0–9; and step c) indicates that A(I,J) should be initialized to zero at the start. One skilled in the art will realize that an interchange of the loops of Example 1 may help performance, since the memory accesses will become more sequential.

This can be understood by reference to FIG. 1, wherein a 10×10 memory matrix is schematically illustrated. If the above-noted Before code listing is executed, the following I,J addresses are accessed in sequence: 0,0; 0,1; 0,2; 0,3 . . . . Note that this addressing requires memory positions 0, 10, 20, 30, etc to be sequentially accessed, requiring multi-memory position increment for each address action.

By performing a loop interchange between the I loop and the J loop to reach the "After" code listing in Example 1, the resulting J×I addressing accesses memory positions 0–30 . . . . in sequence, thus achieving a single step or "stride one" incrementing of address positions (i.e., a more efficient and faster executing procedure).

A loop interchange requires perfect loop nests, that is, no code is present within the body of the outer loop other than one or more inner loop(s). A set of loops which comprise other than a perfect loop nest is referred to as an imperfect loop nest. One strategy for interchanging imperfect loop nests is first to apply an "enabling" transformation, such as loop distribution, which takes an outer loop that surrounds multiple components, and converts the outer loop into multiple loops around each individual component. For example:

| Before      |    | After       |
|-------------|----|-------------|
| DO I = 0,9  |    | DO I = 0,9  |
| X(I) = 3    | => | X(I) = 3    |
| DO J = 0,9  |    | END DO      |
| A(I,J) = 0  |    | DO I = 0,9  |
| END DO      |    | DO J = 0,9  |
| END DO      |    | A(I,J) = 0  |

Example 2

The loop distribution illustrated in the "After" code of Example 2 splits the DO I outer loop into two loops and allows isolation of the imperfection (i.e., X(I)=3). Thereafter, the second loop nest can be interchanged, as shown in Example 1. Further examples of both loop interchange and loop distribution can be found in Zima and Chapman, *Supercompilers for Parallel and Vector Computers*, ACM Press, 1991.

The practical difficulties of such program manipulations are: (i) neither a loop interchange nor a loop distribution are always legal, and (ii) loop distribution, by itself, may be a detrimental transformation, as it raises loop overhead, and more importantly, may lower memory reuse. Accordingly, an algorithm is needed that achieves the distribution-enabled interchanges as above, only when legal, and avoids detrimental distributions when no subsequent interchange is enabled.

For simple cases, such manipulations have been achieved, essentially by speculatively distributing loops; seeing if profitable loop interchanges result; and if not, abandoning the distribution and restoring the original code. See: McKinley et al., "Improving Data Locality with Loop Transformations", ACM Transactions on Programming Languages and Systems, July 1996, Vol. 18, Num. 4.

To summarize, the prior art recognizes that loop interchanges, standing alone may improve program performance by improving a sequence of memory accesses. Further, it is known that by starting with a loop distribution, that a subsequent loop interchange may be enabled which will improve program execution. However, to Applicant's knowledge, it has not been realized that where a potential loop distribution is illegal, that an enabling loop interchange may open a route for further program code improvements.

SUMMARY OF THE INVENTION

A compiler optimizing procedure improves a sequence of memory addressing actions of a program, wherein the program includes a plurality of do loops. The procedure includes the steps of: performing an interchange of do loops, within a set of nested loops, to move at least one loop of the set to a position of an outer loop, wherein the one loop manifests a condition which prevents application of a distribution action thereto; attempting distribution of a next outermost loops so as to isolate a code segment in the program from remaining interior loops of the set of nested loops; and if the distribution is performed, determining for each remaining interior loop if an interchange with another interior loop will improve an efficiency of execution of the program and if yes, performing the loop interchange.

BRIEF DESCRIPTION OF THE DRAWINGS

FIG. 1 is a schematic illustration of a 10×10 memory matrix that is useful in describing the actions of the prior art.

FIG. 2 is a block diagram of a computer system that is adapted to perform the invention hereof.

DETAILED DESCRIPTION OF THE INVENTION

Figure 3:
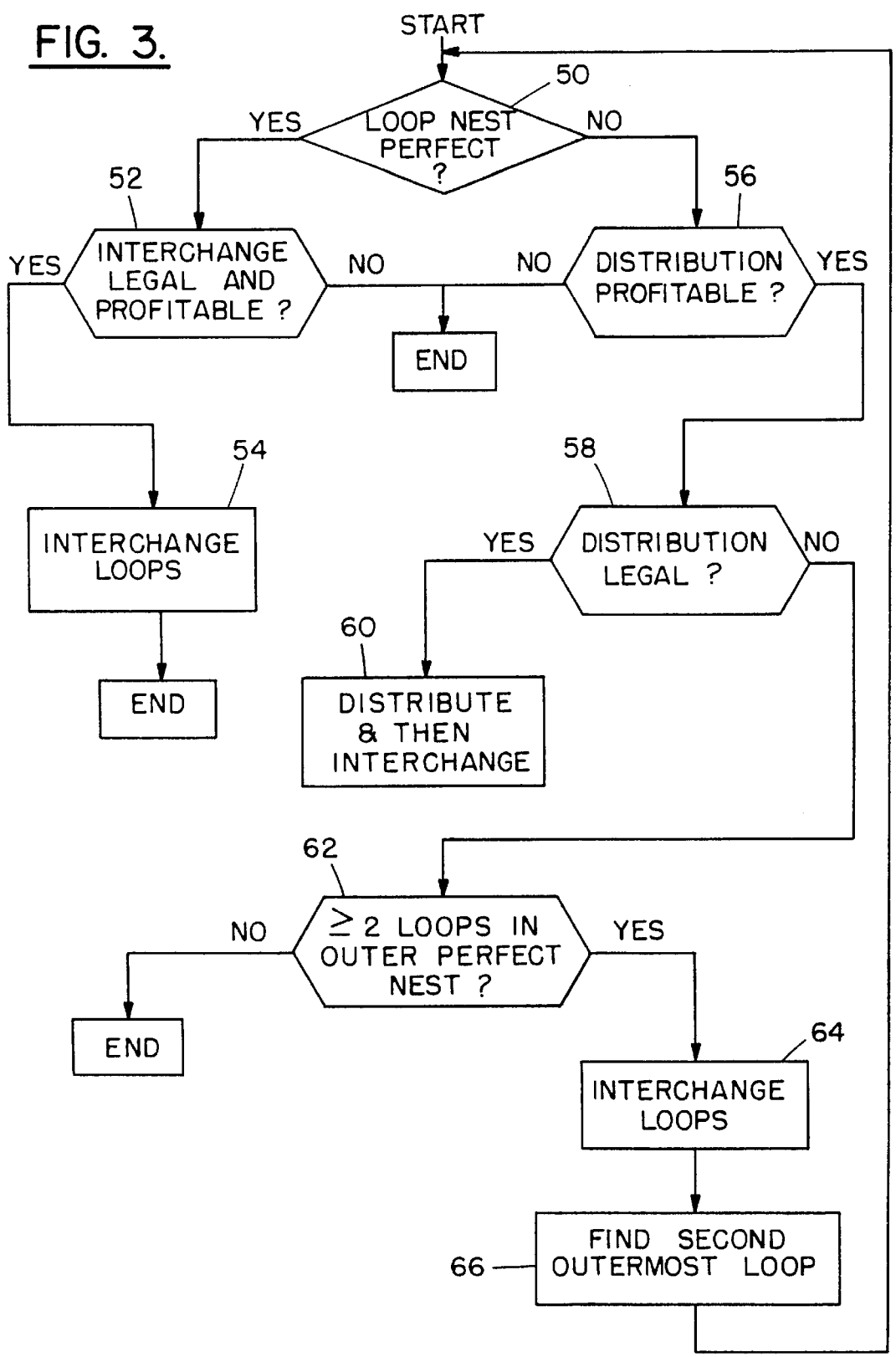
FIG. 3 is a logical flow diagram illustrating the procedure of the invention.

Referring to FIG. 2, a computer 10 includes an input/output module 12 for receiving a program to be compiled and a central processing unit (CPU) 14 for performing compile actions on the program. The received program is stored on a disk drive 18, prior to and after being subjected to the compile action of a compiler procedure 20 which is stored in memory 22.

Compiler procedure 20 includes a code optimizer procedure 24 which further comprises a set of subprocedures that are utilized to perform the optimizing actions. Those subprocedures include a loop interchange procedure 26, a loop distribution procedure 28, a legality procedure 30 (for determining if either a loop interchange or loop distribution is "legal" or "illegal"), and a "profitability" procedure (for determining whether a program manipulation results in improved performance or is detrimental to performance).

While it is to be hereafter assumed that the procedures and subprocedures for performing the method of the invention have already been loaded into memory 22, the controlling programs and subroutines may be present on a memory disk 34, or other memory media, which is loaded directly into CPU 14 to control the action thereof to perform the invention.

Turning to FIG. 3, the procedures employed by the invention to improve the execution of a program will be described. It is initially to be understood that profitability procedure 32, when executed, determines if the execution time of a revised code sequence is improved over a previous non-revised version. If it turns out that the execution sequence of revised code is less efficient, then profitability procedure 32 indicates such fact. More precisely, the result of an optimization action may be to be worsen a sequence of memory addressing actions and thus degrade program performance. In such case, the optimization action is counterproductive and is reversed.

Legality procedure 30 determines if a code transformation will result in an identical calculated result as the pre-transformed code. More specifically, it determines if required data dependencies are maintained in the transformed code. If not, the code transformation is termed "illegal".

As shown in FIG. 3, code optimizer 24 initially determines if a perfect loop nest is present in the program listing, i.e., there is no code in the body of an outer loop other than an inner loop or loops (decision box 50). If it is determined that the loop nest is perfect, then it is next determined whether a loop interchange is both legal and profitable (decision box 52). If the answer is yes, a loop interchange is performed (box 54) and the procedure is at an end. If the interchange is found to be either illegal or not profitable, the procedure is at an end.

Assume now that the loop nest is found to be imperfect (decision box 50). In such case, it is next determined whether a distribution of the loops within the loop nest will improve program performance (i.e., the program performance is more "profitable") (decision box 56). If a distribution action results in the less efficient program operation, the procedure is at an end. By contrast, if it is determined that a distribution action will render a more efficient program performance, then it is next determined whether the distribution action is legal (decision box 58).

For example, a distribution will often be found illegal if data dependencies are violated by the distribution action. Such a case may occur where a data dependency resides in an inner loop of a loop nest, making a loop interchange illegal. Nevertheless, if such an inner loop can be moved so as to become an outer loop and thereby isolate the data dependency to the outer loop, a subsequent interchange of further inner loops may be enabled.

Returning to decision box 58, if it is found that the distribution action is legal, then the procedure moves to box 60 wherein a distribution action is performed, followed by a loop interchange. If, however, the distribution action is found to be illegal (decision box 58), then the procedure moves to decision box 62 wherein it is determined if at least two loops are present in the outer perfect nest of loops. If no, an interchange cannot be performed and the procedure is at an end. Otherwise, an interchange of loops is performed (box 64) which may remove the data dependency to an outer loop (so as to enable a subsequent distribution action).

Thereafter, a second outermost loop is found (box 66) and the procedure recycles to decision box 50. If the second outermost loop (and further loops) are found not to constitute a perfect nest of loops, then the procedure moves to decision boxes 56 and 58 to determine if a distribution will be both profitable and legal. If yes, then the distribution action is performed, enabling a subsequent interchange which is then performed. Accordingly, the initial interchange (box 64) enables a distribution action which, in turn, enables a subsequent interchange action to improve code performance.

The key to achieving the transformation illustrated in FIG. 3 above, is choosing a legal loop interchange that enables a legal distribution that, in turn, enables a profitable and legal interchange. The code listing which implements the above-described procedure is as follows:

```
Loop_Transform (loop) :
    if (loop is perfect nest) then
        if (interchange is legal and profitable) then
            interchange (loop)
        else
            no interchange is attempted
        endif
    else
        if (profitable to distribute) then
            if (legal to distribute) then
                Distribute_And_Interchange(loop)
            else
                Attempt_Distribution_2(loop)
            endif
        endif
end
```

The statement "Attempt_Distribution_2 (loop)" refers to the extra step of trying an enabling distribution and interchange along the lines described above in box 60. For a loop nest to be worth interchanging to enable distribution, its dependencies, which constrain legal transformations, must have a particular form. In the dependence distance vector notation, for instance, distance vectors with zero in the first row are preferred, with some positive number in inner rows, so that the interchanged loop will carry the dependency in the resulting outer loop, making an inner distribution legal. If this condition obtains, the interchange can be executed, with the optimizing procedure applied recursively to the resulting inner loop nests.

In a two-deep nest, there is only one possible interchange. In deeper nests, there may be more legal interchanges which yield inner loops of the appropriate form, all of which may be worth trying. The dependency condition mentioned above helps minimize the number of transformations attempted.

Given the recursion and potential backtracking of the invention, the procedure needs a way of backing out of tentative or speculative transformations. This can be done by reversing the transformation. It may be more efficient to execute the transformations on an auxiliary data structure, which can be simply abandoned if the transformation is found unprofitable, or used as a template to modify the fundamental representation if the transformation is ultimately accepted.

The following is a further detailed example of an application of the invention to a test program sequence. The benchmark code 093. nasa 7/CHOLKSY contains this loop:

```
DO I = 0, NRHS
    DO K = 0, N
        DO L = 0, NMAT
            B(I,L,K) = B(I,L,K) * A(L,0,K)
        END DO
        DO JJ = 1, MIN (M, N-K)
            DO L = 0, NMAT
                B(I,L,K+JJ) = B(I,L,K+JJ)-A(L,-JJ,K+JJ)*B(I,L,K)
            END DO
        END DO
    END DO
    DO K = N, 0, -1
        DO L = 0, NMAT
            B(I,L,K) = B(I,L,K) * A(L,0,K)
        END DO
        DO JJ = 1, MIN (M, K)
            DO L = 0, NMAT
                B(I,L,K-JJ) = B(I,L,K-JJ)-A(L,-JJ,K)*B(I,L,K)
            END DO
        END DO
    END DO
END DO
```

The desired end-result is to interchange the I loop to innermost, to achieve "stride-one" memory accesses. This requires first distributing the I loop, which is obviously legal. This leaves two nests, each of which looks like:

```
DO I = 0, NRHS
    DO K = 0, N
        DO L = 0, NMAT
            B(I,L,K) = B(I,L,K) * A(L,0,K)
        END DO
        DO JJ = 1, MIN (M, N-K)
            DO L = 0, NMAT
                B(I,L,K+JJ) = B(I,L,K+JJ)-A(L,-JJ,K+JJ)*B(I,L,K)
            END DO
        END DO
    END DO
END DO
```

Now there is a double-nest at the top-level. The goal is to get I innermost in the deepest (second) nest. Unfortunately, it is illegal to distribute the I-K loop nest over the L and JJ-L nests. However, if the I-K loop nest is first interchanged, the resulting I loop can be distributed over the two inner loops. This results in:

```
DO K = 0, N
    DO I = 0, NRHS
        DO L = 0, NMAT
            B(I,L,K) = B(I,L,K) * A(L,0,K)
        END DO
    END DO
    DO I = 0, NRHS
        DO JJ = 1, MIN (M, N-K)
            DO L = 0, NMAT
                B(I,L,K+JJ) = B(I,L,K+JJ)-A(L,-JJ,K+JJ)*B(I,L,K)
            END DO
        END DO
    END DO
END DO
```

Now it is legal and profitable to exchange the I loop innermost. Accordingly, the above described loop distribution and loop interchange procedure can apply sequences of distribution and interchange in order to perform a profitable and legal interchange. Further, the procedure avoids doing enabling, and possibly detrimental transformations, unless a profitable transformation results.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for improving an efficiency of a program's execution, wherein said program includes plural do-loops, said method comprising the steps of:

a) performing an interchange of loops, within a set of nested loops, to move at least one loop of said set to a position of an outer loop, wherein said at least one loop manifests a condition which prevents application of a distribution action to said plural do loops;

b) attempting a distribution of a next outermost loop so as to isolate a code segment in said program from remaining interior loops in said set of nested loops; and c) if said distribution is performed, determining for each remaining interior loop if an interchange thereof with another interior loop will improve an efficiency of execution of said program and, if yes, performing said interchange.

2. The method as recited in claim 1 wherein, in step a), said one loop manifests a data dependency condition which prevents application of said distribution action.

3. The method as recited in claim 1 wherein, in step b), said distribution is attempted only if legal and profitable, wherein "legal" means that the program will provide an identical result both before and after said distribution, and wherein "profitable" means that the program will operate more efficiently after distribution than before distribution.

4. The method as recited in claim 1 wherein, in step c), said efficiency of execution of said program is determined as improved by an interchange action if an improved sequence of memory accesses is produced.

5. A memory media for controlling a computer to improve an efficiency of a program's execution, wherein said program includes plural do-loops, said memory media comprising:

a) means for controlling said computer to perform an interchange of loops, within a set of nested loops, to move one loop of said set to a position of an outer loop, wherein said one loop manifests a condition which prevents application of a distribution action to said plural do loops;
b) means for controlling said computer to attempt a distribution of a next outermost loop so as to isolate a code segment in said program from remaining interior loops in said set of nested loops; and
c) means responsive to said distribution being performed, for controlling said computer to determine for each remaining interior loop if an interchange with another interior loop will improve an efficiency of execution of said program and, if yes, for controlling said computer to perform said interchange.

6. The memory media as recited in claim 5, wherein said one loop manifests a data dependency condition which prevents application of said distribution action.

7. The memory media as recited in claim 5 wherein, means b) attempts said distribution only if it is legal and profitable, wherein "legal" means that the program will provide an identical result both before and after said distribution, and wherein "profitable" means that the program will operate more efficiently after distribution than before distribution.

8. The memory media as recited in claim 5, wherein means c) determines that said efficiency of execution of said program has improved by an interchange action, if an improved sequence of memory accesses is produced.

* * * * *